Jan. 18, 1949.                L. W. KASS                 2,459,323
                      BRAKE BEAM SAFETY SUPPORT
Filed Feb. 28, 1945                                3 Sheets-Sheet 1

Inventor:
Lawrence W. Kass:
By [signature] Atty

Jan. 18, 1949.   L. W. KASS   2,459,323
BRAKE BEAM SAFETY SUPPORT
Filed Feb. 28, 1945   3 Sheets-Sheet 2
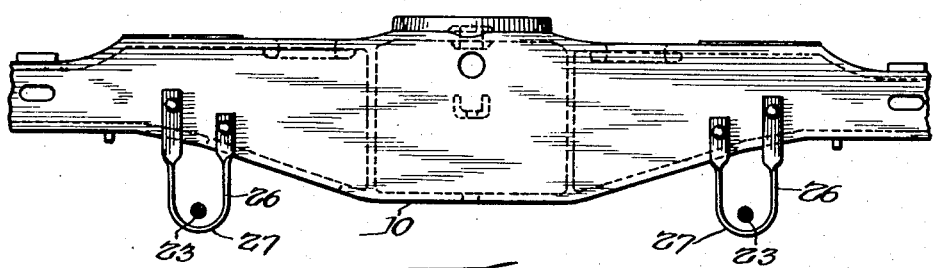
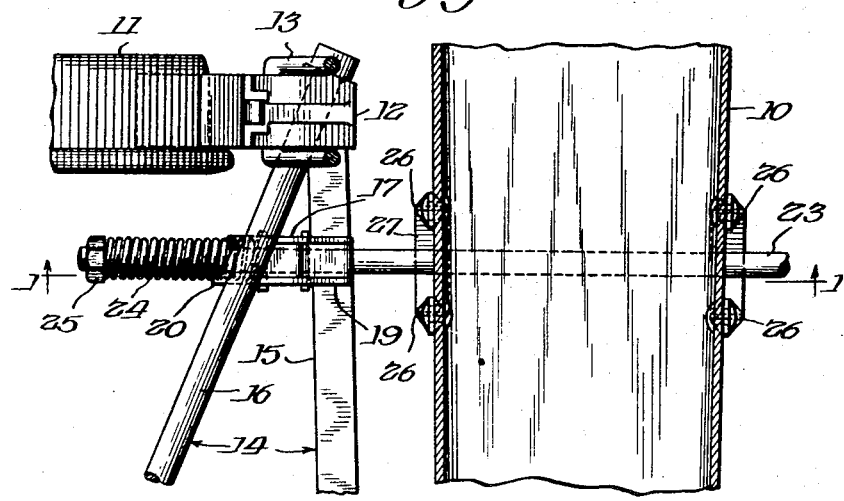
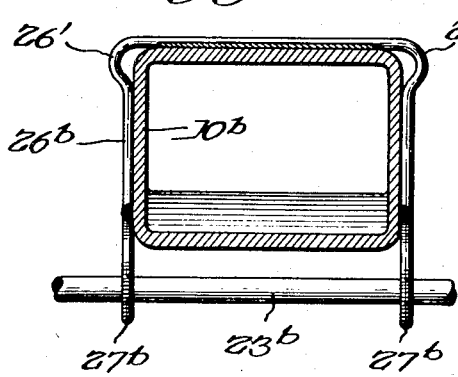
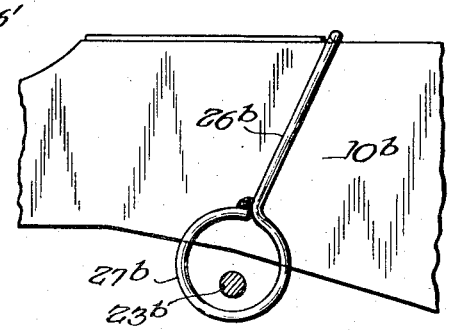
Inventor:
Lawrence W. Kass Jan. 18, 1949. L. W. KASS 2,459,323
BRAKE BEAM SAFETY SUPPORT
Filed Feb. 28, 1945 3 Sheets-Sheet 3
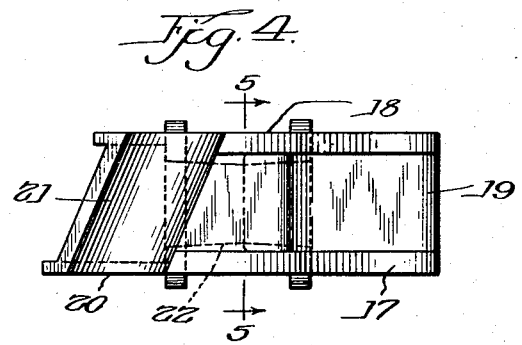
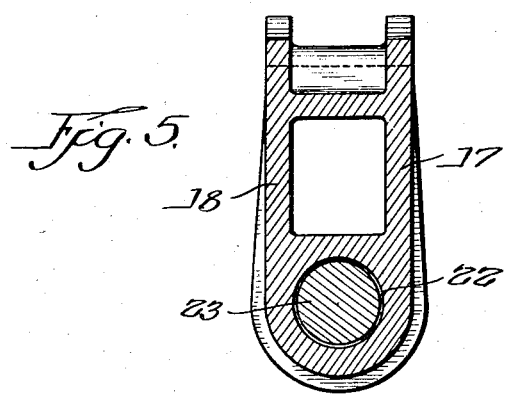
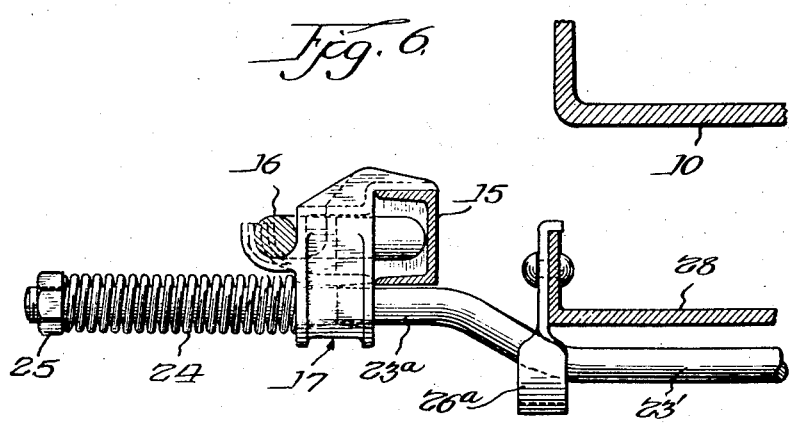
Inventor:
Lawrence W. Kass Patented Jan. 18, 1949

2,459,323

UNITED STATES PATENT OFFICE 2,459,323

BRAKE BEAM SAFETY SUPPORT

Lawrence W. Kass, Chicago, Ill., assignor to Grip Nut Company, Chicago, Ill., a corporation of Illinois Application February 28, 1945, Serial No. 580,145

6 Claims. (Cl. 188—210)

This invention relates to brake beam safety supports, and its principal object is the provision of a novel and improved safety support capable of use on spring plankless car trucks, as well as on cars equipped with spring planks.

As is well known, in many standard car trucks, the brake beams are disposed between the wheels and are suspended at each end by a hanger swingably mounted on the truck frame. Brake actuating mechanism is connected to the brake beams and functions to set and release the brakes, but as the actuating mechanism forms no part of this invention it will not be described.

Another object of the invention is to provide a safety support which may be easily and readily applied to standard brake beams without interference with the hangers or other parts.

Another object is the provision of a safety support for brake beams which safety support, in the event of failure of a hanger, is supported from the bolster or spring plank of the car.

Another object is the provision of a safety support for brake beams which permits of a maximum down movement of the bolster without interference with any part of the safety support.

Another object is the provision of means carried by the compression member of the brake beam and adapted to support the tension member and therewith the brake beam in the event of failure of a hanger.

Another object is the provision of a brake beam safety support constructed and arranged to support the brake beam in the event that the compression member or the tension member, or both, become detached from one of the brake heads.

Another object is the provision of means to support the brake beams in the event a brake head becomes disconnected therefrom.

Other objects and advantages will appear in the course of this specification and with said objects and advantages in view, this invention consists in the several novel features of construction, arrangement and combination of parts hereinafter fully set forth and more definitely pointed out in the appended claims.

The invention is clearly illustrated in the drawings accompanying this specification in which:

Fig. 2 is a side elevation partly broken away of the bolster seen in Fig. 1 showing certain safety loops secured thereto;

Fig. 3 is a view partly in plan and partly in longitudinal section taken substantially on the line 3—3 of Fig. 1;

Fig. 4 is a detail plan of a certain bracket forming part of the device;

Fig. 5 is a cross section taken substantially on the line 5—5 of Fig. 4;

Fig. 6 is a view partly in side elevation and partly in vertical cross section of fragments of a bolster, spring plank and brake beam equipped with a slightly modified form of the invention;

Fig. 7 is a view partly in side elevation and partly in vertical cross section showing a modified form of safety loop; and Fig. 8 is a side elevation of a fragment of the bolster seen in Fig. 7 with the form of safety loop shown in Fig. 7 applied thereto.

Figure 1:
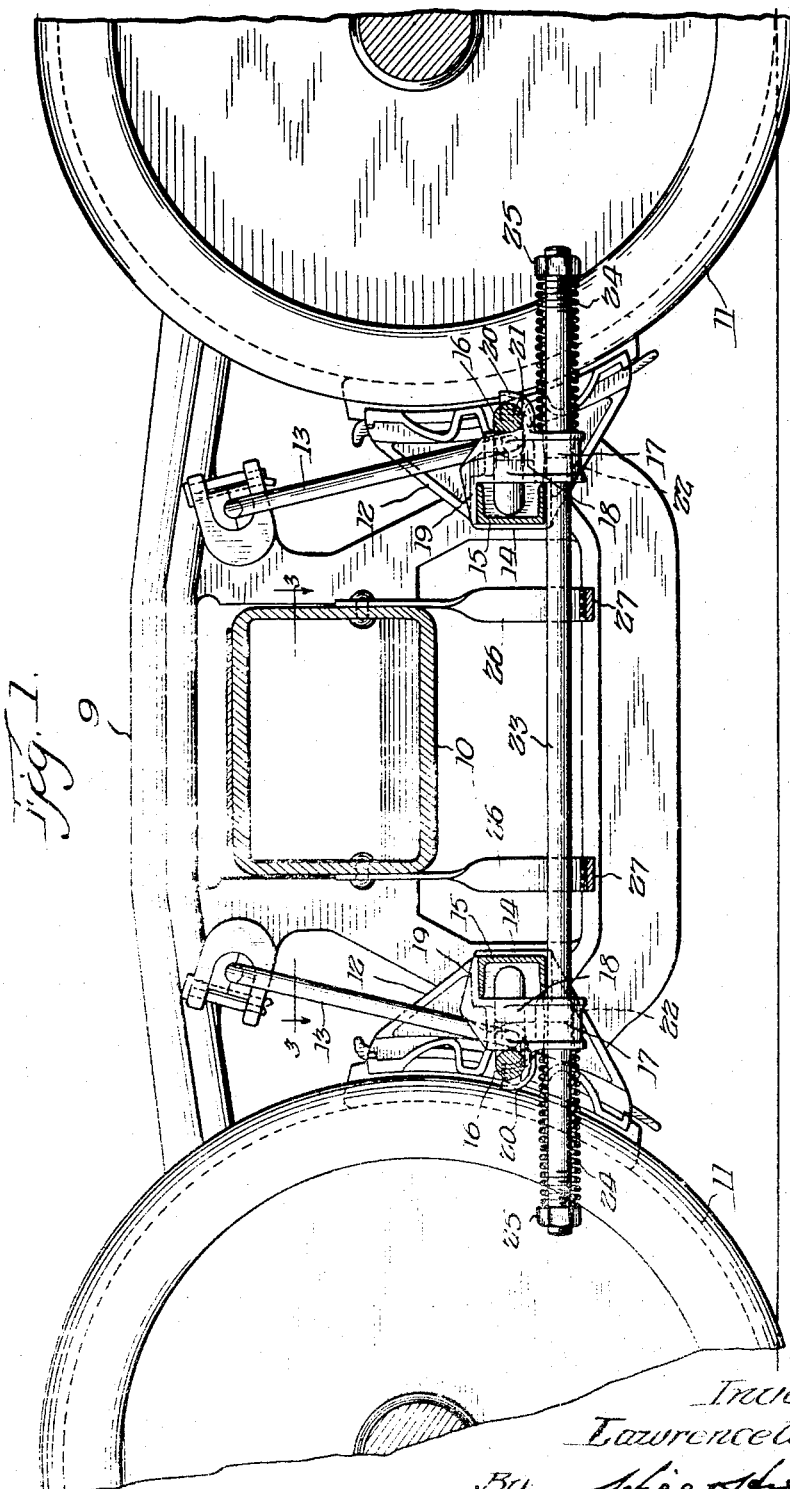
Fig. 1 is a view partly in side elevation and partly in vertical longitudinal section of a railway car truck taken on the line 1—1 of Fig. 3.

Referring to said drawings, and first to Figs. 1 to 5 inclusive, the reference character 10 designates one of the bolsters of a railway car; 11, 11 designate two of the wheels; 12, 12 two brake heads with their shoes, and 13, 13 designate two hangers for the brake beams. The hangers are swingably carried by the truck frame 9 in the usual manner. 14, 14 designate two brake beams upon which the brake heads are mounted; 15, 15 designate the compression members, and 16, 16 the tension members of the brake beams.

The parts above mentioned are standard equipment of railway cars and require no further description, so far as this specification is concerned.

Interposed between the compression and tension members of each brake beam adjacent the hangers are brackets 17, preferably in the form of malleable iron castings. As both brackets 17 are similar, except that one is right and one is left, a description of one will suffice for both. Each bracket 17 has a body portion 18 interposed between the compression and tension members, two straight sides of which engage the compression and tension members respectively whereby the bracket is held therebetween. Projecting laterally from the upper end of the body portion on the side thereof which engages the compression member 15 is a flange 19 which overlies the compression member and supports the bracket thereon.

Projecting from the body portion on the side thereof which engages the tension member is a seat member 20 for the tension member. The seat member has a concave seat 21 which extends parallel with the oblique portion of the tension member and permits the tension member to seat therein and be supported thereby, particularly in the event of failure of the adjacent hanger, or brake head.

The body portion of each bracket extends down below the brake beam and has a hole 22 therein extending horizontally therethrough in a direction transversely of the brake beam, and through the holes of both brackets extends a positioning rod 23 upon which both brackets may slide when the brakes are applied or released.

To aid in releasing the brakes, the positioning rod is provided with a coiled compression spring 24 at each end which is interposed between the adjacent bracket and a collar or nut 25 secured on the end of the rod. In applying the brakes the springs are compressed somewhat and when the brakes are released the springs expand and release the brakes. The rod 23 positions and locks the brackets 17 to the compression and tension members of the brake beam.

Secured to and extending down from both sides of the bolster are auxiliary supports 26, here shown in the form of safety loops, riveted or otherwise secured to the bolster with the U-bends 27 of the loops extending under the rod 23 and functioning to support the rod and the parts carried thereby, in the event of failure of a hanger. The safety loops have sufficient play with respect to the positioning rod to permit a maximum downward movement of the bolster as permitted by the car springs (not shown). It is to be observed that with the positioning rod disposed entirely below the brake beams the bolster may rise and fall a maximum distance without interfering with the rod. Furthermore, that the safety support forming the subject matter of this specification can be used with spring plankless trucks because in the event of failure of a hanger the adjacent end of a brake beam is carried from the bolster by the adjacent safety loop.

In operation, the brake beams are carried by the hangers in the usual manner and the brakes may be set without any interference whatsoever by the safety support. In the event of failure of a hanger, or in the event one of the brake heads becomes disconnected from the compression rod or tension rod or both, the adjacent end of the brake beam, together with the adjacent bracket 17 and the adjacent end of the positioning rod drop and the rod is caught by the adjacent safety loop and is supported thereby. The tension member of the brake beam is then carried by the seat portion of the bracket and the compression member is carried by the positioning rod. As a result the brake beam and parts carried thereby are prevented from falling to the road bed and causing possible derailment. With the brake beams supported at one or both ends by the safety loops the brakes may be applied and released as usual.

In the modified form of the invention illustrated in Fig. 6, the safety support is adapted for use on a car equipped with a spring plank 28. In this case the positioning rod 23a is bent downward at an angle to the part thereof which extends through the bracket to bring the intermediate part 23¹ below the spring plank. A safety loop 26a is bolted or riveted to each side of the spring plank with the loop portion thereof extending under the positioning rod. In other respects the construction and operation of the modified safety support is practically the same as that of the preferred form.

In the modified forms illustrated in Figs. 7 and 8 the loops 27b are formed on the ends of a rod 26b which is bent intermediate its ends to form an inverted U shape with outwardly bowed bends 26¹ at its corners which function to press the legs of the U against the sides of the bolster.

In this form rivets or the like are dispensed with and the drilling of holes in the bolster is avoided. The support is merely slipped upon the bolster and held therein by spring pressure.

If desired, the ends of the loops 27b may be spot-welded together and spot-welded to the bolster 10b. As in the other forms, the positioning rod 23b extends through the loops.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a brake beam safety support for brake rigging comprising a pair of brake beams, each including a compression member and a tension member and swingable hangers for supporting the brake beams, the combination of single piece brackets, one adjacent each hanger and each having a body portion disposed between the compression and tension members and extending down below the same, each said bracket being formed with a laterally projecting horizontal flange at its upper end resting on the associated compression member, and each said bracket having a hook-like seat member arranged to underlie the associated tension member, said seat member having a concave seat paralleling the tension member, brake beam positioning rods extending through the brackets below the brake beams and locking them upon the brake beams, with the compression member confined between said flange and positioning rod, and auxiliary supporting means for supporting the positioning rods in the event of failure of a hanger.

2. In a brake beam safety support for brake rigging comprising a pair of brake beams, each including a compression member and a tension member and swingable hangers for supporting the brake beams, the combination of single piece brackets, one adjacent each hanger and each having a body portion disposed between the compression and tension members and extending down below the same, each said bracket being formed with a laterally projecting horizontal flange at its upper end resting on the associated compression member, and each said bracket having a hook-like seat member arranged to underlie the associated tension member, said seat member having a concave seat paralleling the tension member, brake beam positioning rods extending through the brackets below the brake beams and locking them upon the brake beams, with the compression member confined between said flange and positioning rod, and safety loops for supporting the positioning rods in the event of failure of the hangers, said loops being secured to a member of the car truck of a railway car equipped with the safety device.

3. In a brake beam safety support for brake rigging comprising a pair of brake beams, each including a compression member and a tension member and swingable hangers for supporting the brake beams, the combination of single piece brackets, one adjacent each hanger and each having a body portion disposed between the compression and tension members and extending down below the same, each said bracket being formed with a laterally projecting horizontal flange at its upper end resting on the associated compression member, and each said bracket having a hook-like seat member arranged to underlie the associated tension member, said seat member having a concave seat paralleling the tension member, brake beam positioning rods extending through the brackets below the brake beams and locking them upon the brake beams, with the compression member confined between said flange and positioning rod, and safety loops for supporting the positioning rods in the event of failure of the hangers, said loops being secured to the bolster of a railway car equipped with the safety device.

4. In a safety support for brake beams of railway cars employing hangers for supporting the brake beams, said safety support comprising a pair of brackets, each comprising a body portion disposed between the compression and tension members of the brake beams and each said bracket being formed with a laterally projecting horizontal flange at its upper end resting on the associated compression member, and each said bracket having a hook-like seat member arranged to underlie the associated tension member whereby to support the brake beam in the event of failure of one of the hangers, said seat member having a concave seat paralleling the tension member, and auxiliary supporting means carried by a member of the car truck and including positioning rods having end portions disposed entirely below said brake beams and extending through holes in the brackets, with the compression member confined between said flange and positioning rod.

5. In a safety support for brake beams of railway cars employing hangers for supporting the brake beams, said safety support comprising a pair of brackets each consisting of a single piece, one adjacent each hanger and each having a body portion disposed between the compression and tension members, said body extending down below the brake beams, each said bracket being formed with a laterally projecting horizontal flange at its upper end resting on the associated compression member and each said bracket having a hook-like seat member arranged to underlie the associated tension member, said seat member having a concave seat paralleling the tension member, brake beam positioning rods extending through the brackets below the brake beams and locking them upon the brake beams, with the compression member confined between said flange and positioning rod, and rod supporting loops secured to the bolster of a railway car equipped with the safety device, said positioning rods extending through said loops.

6. In a brake beam safety support and in combination, a truck bolster, a pair of brake beams, one disposed at each side of the bolster, swingable hangers for supporting said brake beams, each brake beam comprising a compression member and a tension member, single piece brackets, one adjacent each hanger and each having a body portion disposed between the compression and tension members and extending down below the same, each said bracket being formed with a laterally projecting horizontal flange at its upper end resting on the associated compression member and each said bracket having a hook-like seat member arranged to underlie the associated tension member, said seat member having a concave seat paralleling the tension member, brake beam positioning rods extending through the brackets below the brake beams with the compression member confined between said flange and positioning rod, and each positioning rod having a downwardly offset intermediate part underlying the spring plank, and safety loops secured to the spring plank and formed with U-bends underlying the positioning rods.

LAWRENCE W. KASS.

REFERENCES CITED

The following references are of record in the file of this patent:

UNITED STATES PATENTS

| Number | Name | Date |
| --- | --- | --- |
| 1,724,265 | Ekholm | Aug. 13, 1929 |
| 1,816,639 | Crone | July 28, 1931 |
| 2,067,617 | Naylor | Jan. 12, 1937 |
| 2,077,547 | Busse | Apr. 20, 1937 |
| 2,093,797 | Baselt | Sept. 21, 1937 |
| 2,105,995 | Busse | Jan. 18, 1938 |
| 2,105,998 | Cottrell | Jan. 18, 1938 |
| 2,159,582 | Anderson | May 23, 1939 |
| 2,365,221 | Kass | Dec. 5, 1944 |